United States Patent
Itakura

(10) Patent No.: US 8,285,911 B2
(45) Date of Patent: Oct. 9, 2012

(54) COMPUTER APPARATUS, COMPUTER SYSTEM AND ADAPTER CARRY-OVER METHOD

(75) Inventor: Minoru Itakura, Hadano (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 12/897,120

(22) Filed: Oct. 4, 2010

(65) Prior Publication Data

US 2011/0131361 A1 Jun. 2, 2011

(30) Foreign Application Priority Data

Oct. 5, 2009 (JP) .................................. 2009-231078

(51) Int. Cl.
*G06F 13/36* (2006.01)
(52) U.S. Cl. ...................................... 710/314; 370/389
(58) Field of Classification Search .......... 710/313–316; 370/351, 389
See application file for complete search history.

(56) References Cited

U.S. PATENT DOCUMENTS

| 7,058,738 | B2 | 6/2006 | Stufflebeam, Jr. |
| 7,809,977 | B2 | 10/2010 | Takamoto |
| 7,907,604 | B2 | 3/2011 | Boyd et al. |
| 7,991,839 | B2 | 8/2011 | Freimuth et al. |
| 8,078,764 | B2 | 12/2011 | Okitsu et al. |
| 2006/0242353 | A1 | 10/2006 | Torudbakken et al. |

FOREIGN PATENT DOCUMENTS

| JP | 2007-195166 A | 8/2007 |
| JP | 2008-171413 A | 7/2008 |
| JP | 2008-310489 A | 12/2008 |
| JP | 2009-181418 A | 8/2009 |

OTHER PUBLICATIONS

Multi-Root I/O Virtualization and Sharing Specification Revision 1.0, May 12, 2008, 2 pp.

*Primary Examiner* — Clifford Knoll
(74) *Attorney, Agent, or Firm* — Mattingly & Malur, PC

(57) ABSTRACT

To obtain a computer that can change over from the active system to the standby system without reconnecting the I/O adapters. The computer according to the present invention carries over the identifiers logically identifying connection paths between computer modules and I/O adapters from active computers to standby computers.

8 Claims, 12 Drawing Sheets

FIG. 3

| Switch | Port# | Direction | Type | Link destination |
|---|---|---|---|---|
| 300a | 301a-1 | up | Host | 100a |
| | 301a-2 | up | Host | 100b |
| | 301a-3 | up | Host | 100c |
| | 301a-4 | up | Host | 100d |
| | 301a-5 | up | Host | 110e |
| | 301a-6 | up | Host | 110f |
| | 302a-1 | down | Device | 220a-1 |
| | 302a-2 | down | - | - |
| | 302a-3 | down | Device | 220a-3 |
| | 302a-4 | down | - | - |
| | 302a-5 | down | Device | 220a-5 |
| | 302a-6 | down | - | - |
| | 302a-7 | down | - | - |
| | 302a-8 | down | Device | 220a-8 |
| 300b | 301b-1 | up | Host | 100a |
| | 301b-2 | up | Host | 100b |
| | 301b-3 | up | Host | 100c |
| | 301b-4 | up | Host | 100d |
| | 301b-5 | up | Host | 110e |
| | 301b-6 | up | Host | 110f |
| | 302b-1 | down | - | - |
| | 302b-2 | down | Device | 220b-2 |
| | 302b-3 | down | - | - |
| | 302b-4 | down | Device | 220b-4 |
| | 302b-5 | down | Device | 220b-5 |
| | 302b-6 | down | - | - |
| | 302b-7 | down | Device | 220b-7 |
| | 302b-8 | down | - | - |

<Virtual switch management table 330>

| Switch | VS# | Validity | Start VB# | Entry number |
|---|---|---|---|---|
| | 331 | 332 | 333 | 334 | 335 |
| 300a | 1 | Yes | 1 | 3 |
| | 2 | No | - | 0 |
| | 3 | Yes | 6 | 2 |
| | 4 | Yes | 8 | 2 |
| | 5 | No | - | 0 |
| 300b | 6 | No | - | 0 |
| | 7 | Yes | 15 | 3 |
| | 8 | Yes | 18 | 2 |
| | 9 | Yes | 20 | 2 |
| | 10 | No | - | 0 |

<Virtual bridge management table 340>

| Switch | VB# | Validity | Direction | Map | Port# | VH# |
|---|---|---|---|---|---|---|
| | 341 | 342 | 343 | 344 | 345 | 346 | 347 |
| 300a | 1 | Yes | up | Yes | 301a-1 | 0 |
| | 2 | Yes | down | Yes | 302a-1 | 0 |
| | 3 | Yes | down | Yes | 302a-3 | 0 |
| | 4 | No | - | No | - | - |
| | 5 | No | - | No | - | - |
| | 6 | Yes | up | Yes | 301a-3 | 0 |
| | 7 | Yes | down | Yes | 302a-5 | 0 |
| | 8 | Yes | up | Yes | 301a-4 | 0 |
| | 9 | Yes | down | Yes | 302a-8 | 0 |
| | 10 | No | - | No | - | - |
| | 11 | No | - | No | - | - |
| | 12 | No | - | No | - | - |
| 300b | 13 | No | - | No | - | - |
| | 14 | No | - | No | - | - |
| | 15 | Yes | up | Yes | 301b-2 | 0 |
| | 16 | Yes | down | Yes | 302b-2 | 0 |
| | 17 | Yes | down | Yes | 302b-4 | 0 |
| | 18 | Yes | up | Yes | 301b-3 | 0 |
| | 19 | Yes | down | Yes | 302b-7 | 0 |
| | 20 | Yes | up | Yes | 301b-4 | 0 |
| | 21 | Yes | down | Yes | 302b-5 | 0 |
| | 22 | No | - | No | - | - |
| | 23 | No | - | No | - | - |
| | 24 | No | - | No | - | - |

FIG. 5

<Resource assignment table 430>

| Switch | I/O adapter | Host |
|---|---|---|
| 300a | 220a-1 | 100a |
| | 220a-3 | 100a |
| | 220a-5 | 100c |
| | 220a-8 | 100d |
| 300b | 220b-2 | 100b |
| | 220b-4 | 100b |
| | 220b-5 | 100d |
| | 220b-7 | 100c |

Columns: 431, 432, 433

FIG. 6

<Host management table 440>

| Host | Active/Standby type |
|---|---|
| 100a | Active |
| 100b | Active |
| 100c | Active |
| 100d | Active |
| 110e | Standby |
| 110f | Standby |

Columns: 441, 442

FIG. 8

<Bus assignment management table 370>

| Switch | VB# | PBus# | SBus# | SubBus# |
|---|---|---|---|---|
| 300a | 1 | 1 | 2 | 4 |
| | 2 | 2 | 3 | 3 |
| | 3 | 2 | 4 | 4 |
| | 4 | - | - | - |
| | 5 | - | - | - |
| | 6 | 1 | 2 | 3 |
| | 7 | 2 | 3 | 3 |
| | 8 | 1 | 2 | 3 |
| | 9 | 2 | 3 | 3 |
| | 10 | - | - | - |
| | 11 | - | - | - |
| | 12 | - | - | - |
| 300b | 13 | - | - | - |
| | 14 | - | - | - |
| | 15 | 1 | 2 | 4 |
| | 16 | 2 | 3 | 3 |
| | 17 | 2 | 4 | 4 |
| | 18 | 4 | 5 | 6 |
| | 19 | 5 | 6 | 6 |
| | 20 | 4 | 5 | 6 |
| | 21 | 5 | 6 | 6 |
| | 22 | - | - | - |
| | 23 | - | - | - |
| | 24 | - | - | - |

<Bus assignment management table 370>

| Switch | VB# | PBus# | SBus# | SubBus# |
|---|---|---|---|---|
| 300a | 1 | 1 | 2 | 4 |
| | 2 | 2 | 3 | 3 |
| | 3 | 2 | 4 | 4 |
| | 4 | — | — | — |
| | 5 | — | — | — |
| | 6 | 1 | 2 | 3 |
| | 7 | 2 | 3 | 3 |
| | 8 | 1 | 2 | 3 |
| | 9 | 2 | 3 | 3 |
| | 10 | 1 | 2 | 4 |
| | 11 | 2 | 3 | 3 |
| | 12 | 2 | 4 | 4 |
| 300b | 13 | — | — | — |
| | 14 | — | — | — |
| | 15 | 1 | 2 | 4 |
| | 16 | 2 | 3 | 3 |
| | 17 | 2 | 4 | 4 |
| | 18 | 4 | 5 | 6 |
| | 19 | 5 | 6 | 6 |
| | 20 | 4 | 5 | 6 |
| | 21 | 5 | 6 | 6 |
| | 22 | — | — | — |
| | 23 | — | — | — |
| | 24 | — | — | — |

COMPUTER APPARATUS, COMPUTER SYSTEM AND ADAPTER CARRY-OVER METHOD

CLAIM OF PRIORITY

The present application claims priority from Japanese patent application JP 2009-231078 filed on Oct. 5, 2009, the content of which is hereby incorporated by reference into this application.

BACKGROUND OF THE INVENTION

1. Field of the Invention

The present invention relates to a computer apparatus, a computer system and an adapter carry-over method in the computer apparatus.

2. Background Art

Blade servers that have plural computers in a single apparatus have been used in recent years to facilitate server management (for example, U.S. Pat. No. 7,058,738). Multi-core design that includes plural processor cores has improved the performance of CPU (Central Processing Unit), and with this improvement, virtual server technologies that allow plural virtual servers to operate in a single computer have been used in order to effectively use CPU. In the virtual server technologies, methods such that physical processors and memory are virtualized by firmware called hypervisor and arbitrary numbers of logical partitions (logical processor) are generated in a computer are used.

A computer uses an I/O adapter such as NIC (Network Interface Card) and FC-HBA (Fiber Channel-Host Bus Adapter) for network communication with other computers and for connection with storage devices. At that time, when plural serves are operated on a single computer as described above, the number of I/O adapters per computer becomes relatively insufficient. As a technology to remedy such a problem, the multi-root PCIe switch technology that allows for connection between plural computers and PCI (Peripheral Component Interconnect) devices or PCI Express (PCIe) devices that are plural I/O adapters has been known.

In the multi-root PCIe switch technology, it is possible to vary the number of PCIe devices that can be connected to a single computer in a scalable manner (for example, U.S. Pat. No. 7,058,738, US Patent Application Publication No. 2006/242353 and others). In the latter disclosing multi-root I/O virtualization technology, the number of PCIe devices can be virtually increased by sharing a single PCIe device. By using these technologies, the shortage of the number of I/O adapters when virtual servers are used can be solved.

Meanwhile, system redundancy has been made to improve availability of systems with a hot standby system that holds operating spare systems in readiness and with a cold standby system that holds non-operating spare systems in readiness. A computer in operation is referred to as an active computer and a computer on standby is referred to as a standby computer or the like.

Because the cold standby system requires longer time to change over systems compared with the hot standby system, and therefore requires longer downtime of the computer system at the time of system changeover. However, the cold standby system does not require expensive cluster software and therefore has been widely used for its advantage in terms of cost.

As an example of switch employing the multi-root I/O virtualization technology, an MR-IOV switch is disclosed in.

"Multi-Root I/O Virtualization and Sharing Specification Revision 1.0, published by PCI-SIG, 2008, 1.2.4.4 (p. 29)"

SUMMARY OF THE INVENTION

In the system redundancy using the conventional cold standby system, computers in an active system and computers in standby system separately have I/O adapters (for example PCI devices). Each of the computers independently assigns identifiers (PCI bus numbers) to connection paths to the I/O adapters in order to logically identify each of the I/O adapters, and each of the I/O adapters is recognized with the use of the identifiers.

When the active system fails and is changed over to the standby system, it is preferable to duplicate the same I/O environment as the I/O environment of the active system in the standby system. However, because each computer recognizes the I/O adapters by independently-assigned identifiers, the correspondence relation between the computers and the I/O adapters is fixed. For that reason, in order to duplicate the same I/O environment as that of the active system after changing over the computer from the active system to the standby system, the I/O adapters used in the active system have to be reconnected to the standby system.

The present invention was made in order to solve the above problem, and it is an object of the present invention to obtain computers that can change over from the active system to the standby system without reconnecting the I/O adapters.

The computers of the present invention carry over the identifiers that logically identify the connection paths between the computer modules and the I/O adapters from the active computers to the standby computers.

According to the computers of the present invention, the identifiers used by the active computers to identify the connection paths are carried over to the standby computers, and therefore the same I/O environment as that of the active system can be realized in the standby system without reconnecting the I/O adapters.

BRIEF DESCRIPTION OF DRAWINGS

FIG. 3 is a diagram illustrating the structure of the port management table 320 and an example of data.

FIG. 4 is a diagram illustrating the structures of the virtual switch management table 330 and the virtual bridge management table 340, and an example of data.

FIG. 5 is a diagram illustrating the structure of the resource assignment table 430 and an example of data.

FIG. 6 is a diagram illustrating the structure of the host management table 440 and an example of data.

FIG. 8 is a diagram illustrating a structure of the bus assignment management table 370 and an example of data.

FIG. 11 is a diagram showing changes in the bus assignment management table 370 when the active computer module 110a is changed over to the standby computer module 110e.

Figure 1:
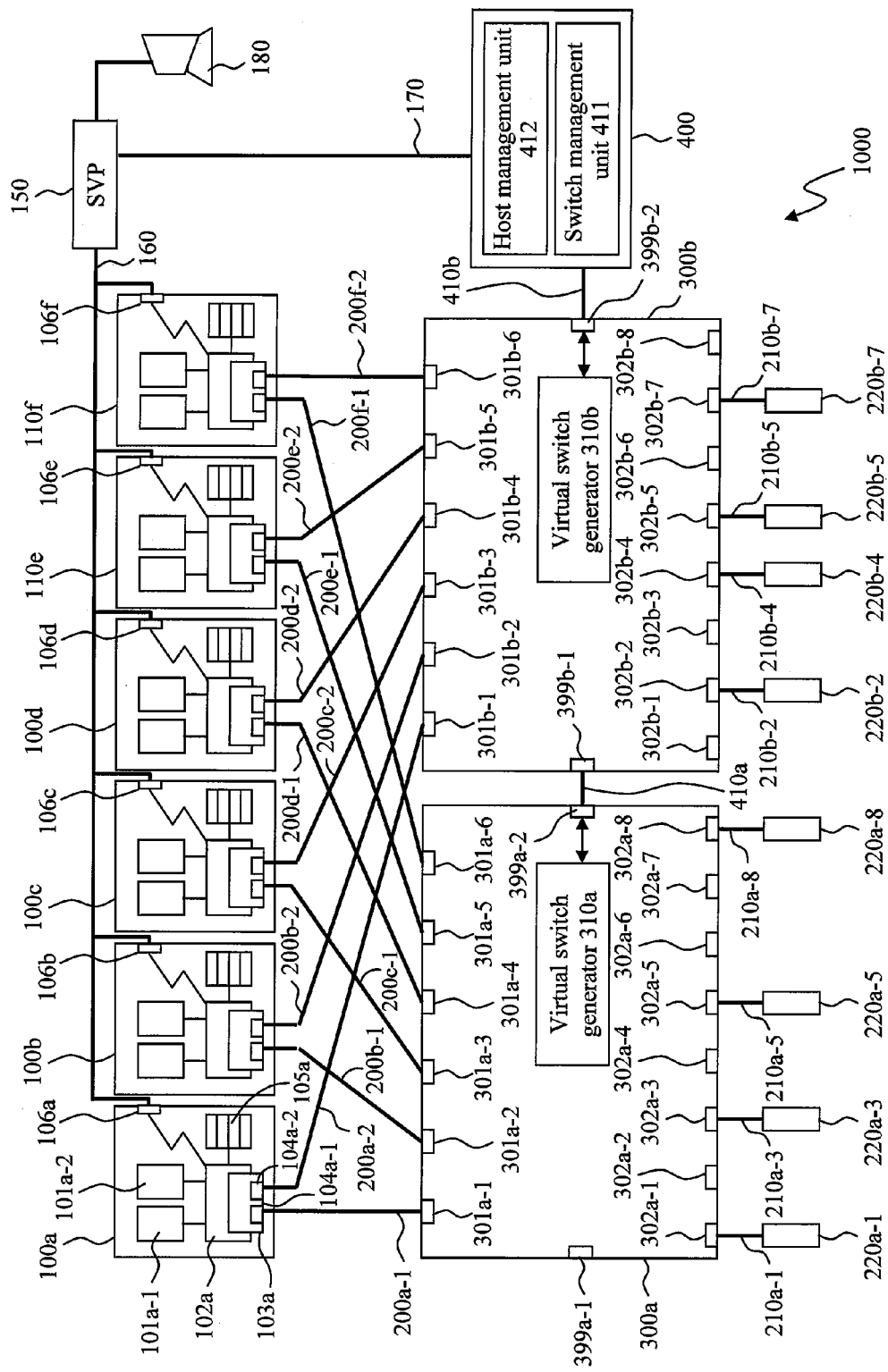
FIG. 1 is a diagram illustrating a configuration of a computer system 1000 according to Embodiment 1.

DESCRIPTION OF SYMBOLS 100a, 100b, 100c, 100d: active computer module
110e, 110f: standby computer module
101-1, 101-2: CPU, 102: chip set
103: route complex
105: memory
106: management port
150: service processor
180: management console
220a-1, 220a-3, 220a-5, 220a-8, 220b-2, 220b-4, 220b-5, 220b-7: I/O adapter
300a, 300b: PCIe switch
301-1, 301-2, 301-3, 301-4, 301-5, 301-6: upstream side bridge
302-1, 302-2, 302-3, 302-4, 302-5, 302-6, 302-7, 302-8: downstream side bridge
310: virtual switch generator
320: port management table
330: virtual switch management table
340: virtual bridge management table
370: bus assignment management table
399-1, 399-2: management port
400: PCI manager
430: resource assignment table
440: host management table
1000, 2000: computer system.

DETAILED DESCRIPTION OF THE PREFERRED EMBODIMENTS

Embodiment 1

FIG. 1 is a diagram illustrating a configuration of a computer system 1000 according to Embodiment 1 of the present invention. The computer system 1000 includes active computer modules 100a, 100b, 100c and 100d, standby computer modules 100e and 100f, a service processor 150, a management console 180, I/O adapters 220a-1, 220a-3, 220a-5, 220a-8, 220b-2, 220b-4, 220b-5 and 220b-7, PCIe switches 300a and 300b, and a PCI manager 400.

Components with the same numerical reference but with different alphabets and indexes have the same configuration. Therefore, in the following description, the components with the same configuration are collectively referred to by arbitrarily omitting the alphabet indexes and numerical indexes.

The active computer module 100 includes CPU 101-1 and 101-2, a chip set 102, a route complex 103, memory 105, and a management port 106.

The route complex 103 includes I/O bridges 104-1 and 104-2 as interfaces to connect to the PCIe switch 300. The active computer 100 accesses to the I/O adapters 220 connected to the PCIe switch 300 via the I/O bridges 104. Note that the I/O adapters can be adapters for storage device, network interface cards, for example, and others such as PCI devices following PCI standard.

The memory 105 stores data or the like required when the CPU 101 operates. For example, the values of PCI bus numbers explained later can be stored.

The management port 106 is a communication port for transmitting and receiving signal for managing the active computer modules 100 from outside of the active computer modules 100, and the port is connected to the service processor 150 via a management connection line 160.

The standby computer module 110 has the same configuration as that of the active computer modules 100, but is different in a point that the standby computer module 110 stands by in a cold standby state (non-operational state).

The service processor 150 is a control device for managing operations of the active computer modules 100, the standby computer module 110 and the PCIe switch 300. The service processor 150 is connected to the management port 106 of each computer module via the management connection line 160, and is also connected to the PCI manager 400 via a management connection line 170.

The management console 180 is a management terminal for system administrators to manage operations of the active computer modules 100, the standby computer module 110, and the PCIe switch 300. The management console 180 is connected to the service processor 150 via a proper interface.

The I/O adapters 220 are electronic devices such as storage devices, which are used by each of the computer modules. The I/O adapters 220 are PCIe devices conforming to the PCI Express standard. It should be noted that in FIG. 1 the indexes of the I/O adapters 220 are numbered so as to match the indexes of the downstream side bridges 302 explained later, and for that reason, the indexes of the I/O adapters 220 are not consecutive.

The PCIe switch 300 has a function as a multi-route PCIe switch, and comprises upstream side bridges 301-1, 301-2, 301-3, 301-4, 301-5, and 301-6, downstream side bridges 302-1, 302-2, 302-3, 302-4, 302-5, 302-6, 302-7, and 302-8, a virtual switch generator 301, and management ports 399-1 and 399-2.

The upstream side bridges 301 are connected to the I/O bridge 104-1 or 104-2 of each computer module via a bus 200. A rule in FIG. 1 is that the I/O bridge 104-1 and the PCIe switch 300a are connected via the bus 200-1, and the I/O bridge 104-2 and the PCIe switch 300b are connected via the bus 200-2. The connection pattern is not limited to this pattern.

The downstream side bridges 302 are connected to I/O adapters 220 via a bus 210. Not all of the downstream side bridges 302 have to be connected to the I/O adapters 220.

The virtual switch generator 310 generates a virtual switch that virtually connects the upstream side bridges 301 and the downstream side bridges 302. Here, virtually connecting means logically connecting any bridges regardless of the physical arrangement of each of the bridges. Virtually connected bridges appear to be directly connected to one another when the connections are viewed from the outside of those bridges. The virtual switch generator 310 can arbitrarily configure the connection between bridges.

The management ports 399 are communication ports for transmitting and receiving signal for managing the operations of the PCIe switch 300 from the outside of the PCIe switch 300. The management ports 399 can be connected to management ports 399 in other PCIe switch 300 to form a cascade topology. FIG. 1 illustrates that the PCI manager 400 is connected to the management port 399b-2, the PCI manager 400 transmits and receives a control signal to and from the PCIe switch 300b, and the signal is shared with the PCIe switch 300a. However, the connection relation is not limited to these connections.

The PCI manager 400 includes a switch management unit 411, and a host management unit 412. In addition, a resource assignment table 430 and a host management table 440 explained with reference to FIG. 5 and FIG. 6 described later are stored in proper storage devices such as memory or a register. The switch management unit 411 manages the operations of the PCIe switch 300. The host management unit 412 manages the operations of each computer module via the service processor 150.

The service processor 150, the virtual switch generator 310, and the PCI manager 400 can be configured by using hardware such as circuit devices that realizes functions of these components. Alternatively, the equivalent function units can be configured by using a processing device such as CPU and software defining its operations.

The service processor 150 and the PCI manager 400 can be integrated into a single configuration. Furthermore, these components can be integrated into each computer, or can be configured as function units separated from each computer.

The entire configuration of the computer system 1000 is explained above. Next, detailed configuration of each unit is explained focusing on management tables for managing correspondence relationship between each of the function units.

Figure 2:
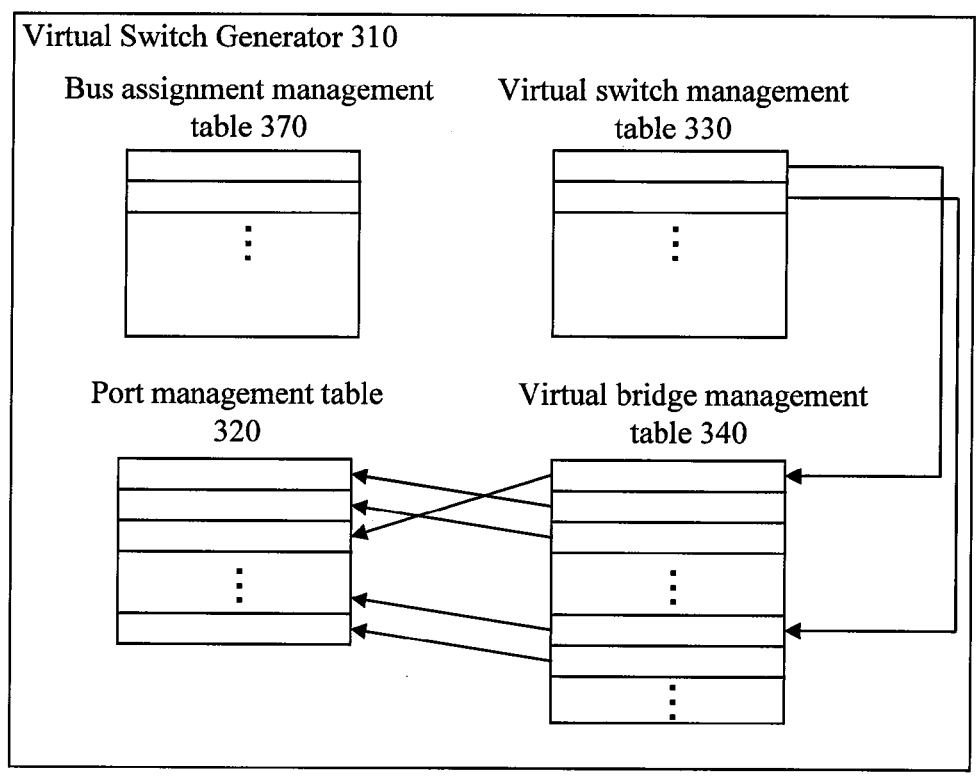
FIG. 2 is a diagram illustrating an internal configuration of the virtual switch generator 310.

FIG. 2 is a diagram illustrating an internal configuration of the virtual switch generator 310. The virtual switch generator 310 stores a port management table 320, a virtual switch management table 330, a virtual bridge management table 340, and a bus assignment management table 370 in proper storage devices such as memory or a register. The configurations of each table are explained in the following descriptions of FIGS. 3 to 6 and FIG. 8.

FIG. 3 is a diagram illustrating the structure of the port management table 320 and an example of data. The port management table 320 is a table for retaining the current state of the port in each bridge of the PCIe switch 300, and as a "switch" column 321, a "port number" column 322, a "direction" column 323, a "type" column 324, and a "link destination" column 325.

The "switch" column 321 has identifiers of the PCIe switches 300. Here, identifiers with the same numerical references as those of the PCIe switches illustrated in FIG. 1 are used for convenience of the explanation. Each of the columns and each of the tables in the following description are explained in the same manner.

The "port number" column 322 has identifiers of ports in each of the bridges. Here, each bridge includes a single port and the numerical reference of each bridge is used as a port identifier.

The "direction" column 323 has a value for distinguishing whether each of the ports is an upstream port or a downstream port. A port with the value in this column being "up" is an upstream port, and a port with the value being "down" is a downstream port.

The "type" column 324 has the type of electrical equipment connected to each port. This column and the "link destination" column 325 would be empty if nothing is connected to the corresponding port.

The "link destination" column 325 has an identifier of electrical equipment connected to the corresponding port.

FIG. 4 is a diagram illustrating the structures of the virtual switch management table 330 and the virtual bridge management table 340, and an example of data. In the following description, columns in each table and correlation between the tables are explained.

The virtual switch management table 330 is a table that retains a state of the virtual switch generated by the virtual switch generator 310, and includes a "switch" column 331, a "VS number" column 332, a "validity" column 333, a "start VB number" column 334, and an "entry number" column 335.

The "switch" column 331 has identifiers of the PCIe switches 300.

The "VS number" column 332 has identification numbers of virtual switches generated by the virtual switch generator 310.

The "validity" column 333 indicates whether the corresponding virtual switch is valid or not.

The "start VB number" 334 has start numbers of virtual bridges (VB) constituting the virtual switches identified in the value in the "VS number" column 332. The virtual bridges are further described in the explanation of the virtual bridge management table 340. If the value in this column is "1", for example, the serial number of the first virtual bridge in the corresponding virtual switch is also "1".

The "entry number" column 335 has the number of virtual bridges constituting the virtual switch identified by the value in the "VS number" column 332. If the value of this column is "3", for example, the corresponding virtual switch has three virtual bridges assigned with three consecutive serial numbers starting from a number designated by the value in the "start VB number" column 334.

The virtual bridge management table 340 is a table that retains a state of virtual bridges in each virtual switch. A virtual bridge corresponds to an interface portion (bridge) that virtually connects PCIe devices. Actual bridges are not as many as the virtual bridges, but logical interfaces are present instead.

The virtual bridge management table 340 includes a "switch" column 341, a "VB number" column 342, a "validity" column 343, a "direction" column 344, a "map" column 345, a "port number" column 346, and a "VH number" column 347.

The "switch" column 341 has identifiers of the PCIe switches 300.

The "VB number" column 342 has identification numbers of virtual bridges generated by the virtual switch generator 310.

The "validity" column 343 indicates whether the corresponding virtual bridge is valid or not.

The "direction" column 344 has values for distinguishing whether the corresponding virtual bridge is associated with an upstream port or associated with a downstream port.

The "map" column 345 indicates whether the corresponding virtual bridge is mapped on the port specified by the values in the "port number" column 346.

The "port number" column 346 has identifiers of ports in each bridge.

The "VH number" column 347 has serial numbers of VH (Virtual Hierarchy). VH is a hierarchical structure of a virtual switch and its peripheral devices.

The example of data in FIG. 4 will be explained. Twelve virtual bridges of "VB number=1 to 12" are assigned to the PCIe switch 300*a*. From among these virtual bridges, ports to which no computer module or I/O adapter is connected (301*a*-2, 302*a*-2, and others) are indicated as "validity=No" and "map=No".

The correlation between the virtual switch management table 330 and the virtual bridge management table 340 will be explained. With reference to the virtual switch management table 330, it should be found that a virtual switch with "VS number=1" has "entry number=3", i.e. three, virtual bridges starting from "VB number=1". With reference to the corresponding parts in the virtual bridge management table 340, it should be found that the virtual bridges with "VB number=1 to 3" have "validity=Yes", and each of the virtual bridges is mapped on either the upstream port or the downstream port.

FIG. 5 is diagram the structure of the resource assignment table 430 and an example of data. The resource assignment table 430 is a table that retains connection relations between the I/O adapters 220 and each computer module, and includes a "switch" column 431, an "I/O adapter" column 432, and a "host" column 433.

The "switch" column 431 has identifiers of the PCIe switches 300.

The "I/O adapter" column 432 has identifiers of the I/O adapters 220.

The "host" column 433 has identifiers of the computer modules 100.

FIG. 6 is a diagram illustrating the structure of the host management table 440 and an example of data. The host management table 440 is a table that retains operation states of each computer module, and includes a "host" column 441, and an "active/standby type" column 442.

The "host" column 441 has identifiers of the computer modules.

The "active/standby type" column 442 has the current operation state of the computer module identified by the values in the "host" column 441. With reference to the values in this column, which of the computer modules are active (in-operation state) or in standby (standby state) can be found.

Figure 7:
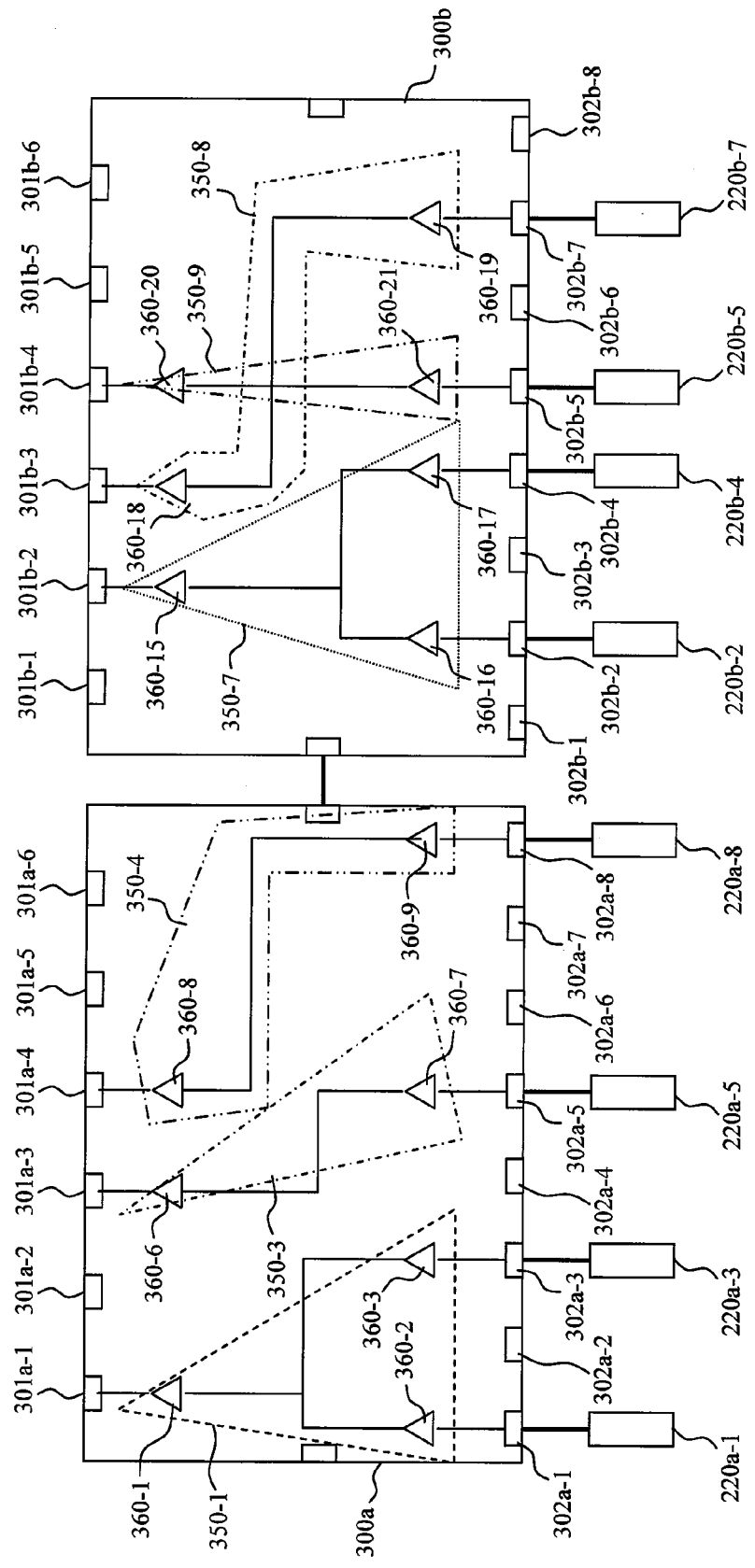
FIG. 7 is a diagram illustrating a configuration of the virtual switch defined by the state of the table illustrated in FIG. 4.

FIG. 7 is a diagram illustrating a configuration of the virtual switch defined by the state of the table illustrated in FIG. 4. In FIG. 7, the indexes of the virtual switch 350 and the virtual bridge 360 correspond to the value in the "VS number" column and the value in the "VB number" column in FIG. 4, respectively.

The virtual switch 350-1 corresponds to the data in the first line of the virtual switch management table 330. In addition, the virtual bridges 360-1, 360-2, and 360-3 in the virtual switch 350-1 correspond to data in first to third lines of the virtual bridge management table 340.

In the similar manner, the virtual switch 350-8 corresponds to data in the eighth line of the virtual switch management table 330. The virtual bridges 360-18 and 360-19 in the virtual switch 350-8 correspond to data in eighteenth and nineteenth lines of the virtual bridge management table 340.

FIG. 8 is a diagram illustrating a structure of the bus assignment management table 370 and an example of data. The bus assignment management table 370 is a table that retains the correspondence relation between the PCI bus numbers and the virtual bridges 360.

The PCI bus numbers are logical identifiers that the computer modules added to connection paths between PCIe devices to identify each of the PCIe devices. In an example of the connection illustrated in FIG. 1 and FIG. 7, for example, the bus 200a-1 in the upstream side from the virtual switch 350-1 is recognized as a PCI bus of "PCI bus number=1", the virtual switch 350-1 is recognized as a PCI bus of "PCI bus number=2", the bus 210a-1 is recognized as a PCI bus of "PCI bus number=3", and the bus 210a-3 is recognized as a PCI bus of "PCI bus number=4".

The bus assignment management table 370 is a table for managing the above-described assignment of the PCI bus numbers, and includes a "switch" column 371, a "VB number" column 372, a "primary bus number" column 373, a "secondary bus number" column 374, and a "subordinate bus number" column 375.

The "switch" column 371 has identifiers of the PCIe switches 300.

The "VB number" column 372 has identification numbers of virtual bridges 360.

The "primary bus number" column 373 indicates PCI bus numbers of connection paths connected in the upstream from the virtual bridge specified by the value in the "VB number" column 372.

The "secondary bus number" column 374 indicates PCI bus numbers of connection paths connected in the downstream from the virtual bridge specified by the value in the "VB number" column 372.

The "subordinate bus number" column 375 indicates PCI bus numbers of connection paths connected in the most downstream from the virtual bridge specified by the value in the "VB number" column 372.

The contents of the bus assignment management table 370 are set by the PCI manager 400. The PCI manager 400 can assign PCI bus numbers in a fixed manner, or can assign PCI bus numbers only to I/O adapters 220 in use conforming to the standard. In a case that the PCI bus numbers are assigned in a fixed manner, PCI bus numbers are provided in advance to unused I/O adapters 220. It should be noted that when the PCI bus numbers are carried over from the active computer modules 100 to the standby computer modules 110, either one of the above methods can be employed.

In the above description, details of the configuration of the computer system 1000 are explained. Next, operations when the system is changed over from active to standby are explained focusing on changes of the values retained in each table.

Figure 9:
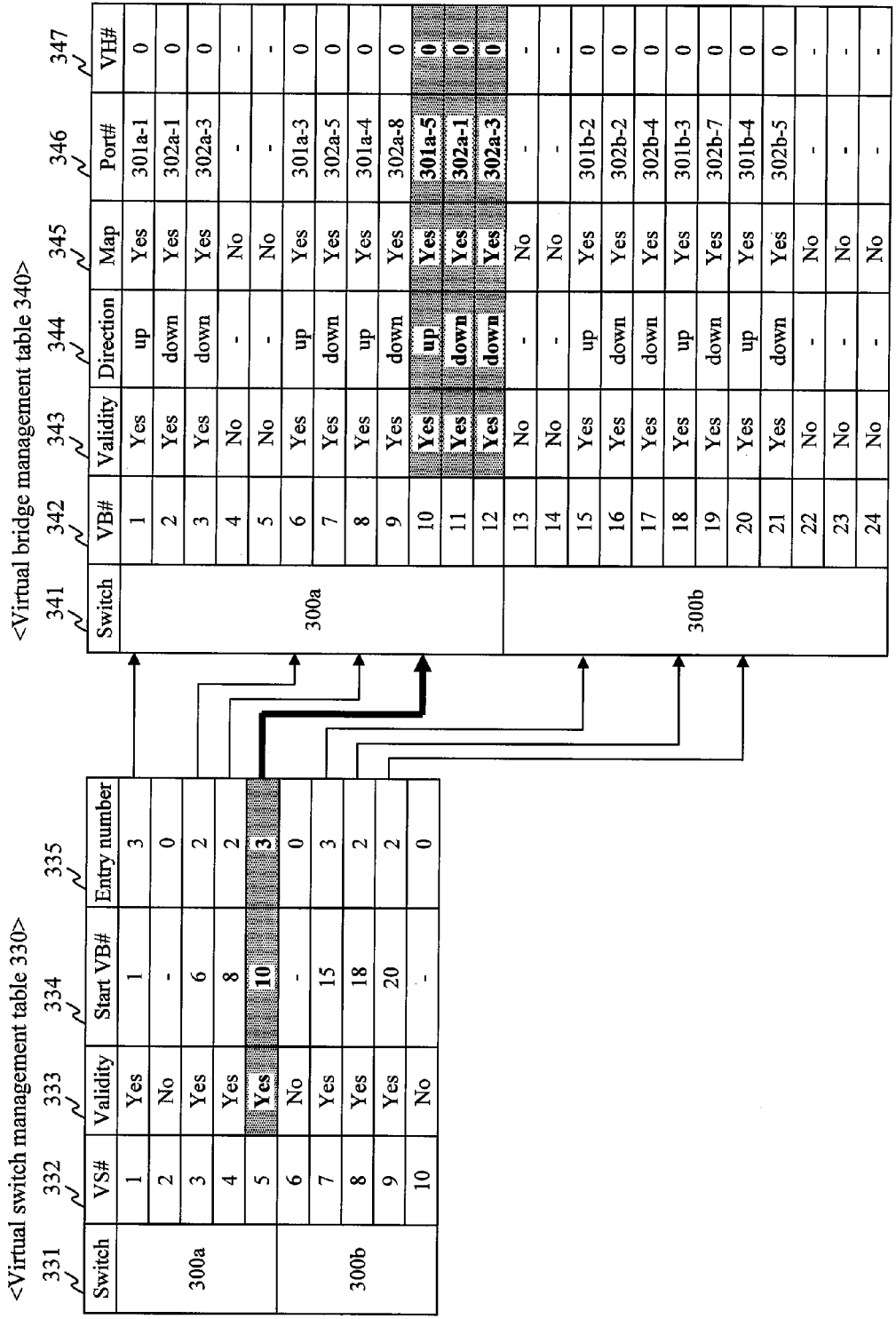
FIG. 9 is a diagram showing the changes in each of the tables when the active computer module 100a is changed over to the standby computer module 110e.

FIG. 9 is a diagram showing the changes in the virtual switch management table 330 and the virtual bridge management table 340 when the active computer module 100a is changed over to the standby computer module 110e.

The virtual switch generator 310a newly generates a virtual switch 360-5 in order to connect the I/O adapters 220a-1 and 220a-3, which were connected to the active computer module 100a by the virtual switch 350-1, to the standby computer module 110e. In addition, virtual bridges 360-10, 360-11, and 360-12 are generated to constitute the virtual switch 360-5.

In the virtual switch management table 330, the entry in the fifth line corresponding to the virtual switch 360-5 is updated. The value in the "start VB number" column 334 is "10" that corresponds to the virtual bridge 360-10, and the value in the "entry number" column 335 is "3" that is the same as the value in the first line.

In the virtual bridge management table 340, the entries in the tenth to twelfth lines corresponding to the virtual bridges 360-10, 360-11, and 360-12 are updated. The value in the "port number" column 346 corresponding to the virtual bridge 360-10 is "301a-5" that indicates an upstream port to which the standby computer module 110e is connected. The eleventh and the twelfth lines corresponding to downstream ports have "302a-1" and "302a-3" that indicate downstream ports to which the I/O adapters 220a-1 and 220a-3 used by the active computer module 100a are connected.

Figure 10:
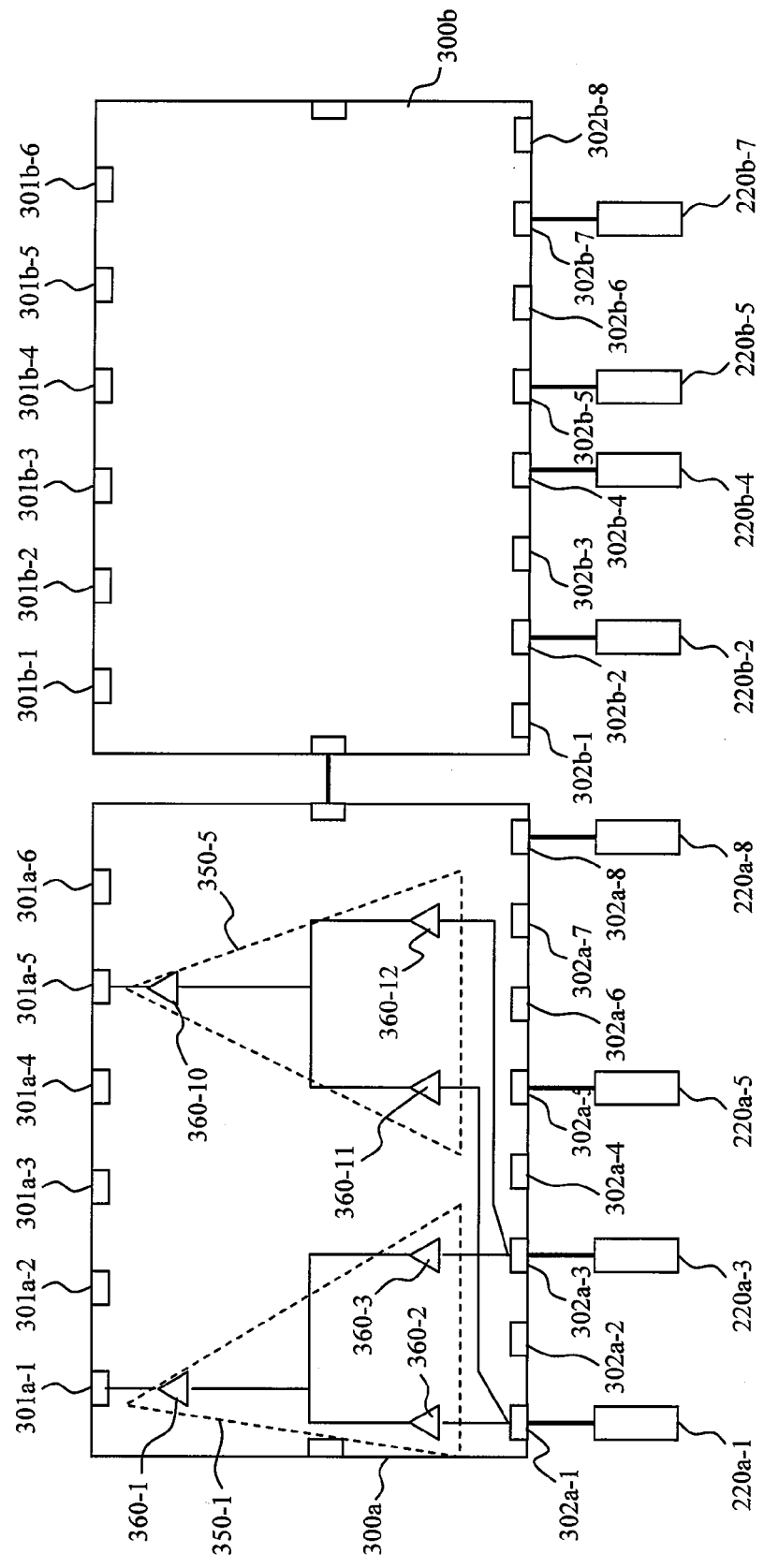
FIG. 10 is a diagram illustrating a configuration of the virtual switch defined by the state of the tables in FIG. 9.

FIG. 10 is a diagram illustrating a configuration of the virtual switch defined by the state of the tables in FIG. 9. For convenience of the description, only the virtual switches that are related to the active computer module 100a and the standby computer module 110e are illustrated.

FIG. 11 is a diagram showing changes in the bus assignment management table 370 when the active computer module 110a is changed over to the standby computer module 110e. The values in the first to third lines corresponding to the virtual bridges 360-1, 360-2, and 360-3 before the changeover are copied to the tenth to twelfth lines corresponding to the virtual bridges 360-10, 360-11, and 360-12 newly generated by the virtual switch generator 310.

If the standby computer module 110e independently assigns the PCI bus numbers, it would be probable that the numbers are not the same as the numbers in the active computer module 100a. In such a case, even if the same I/O adapter is referred to, since the PCI bus number is different from the PCI bus number used by the active computer module 100a, the standby computer module 110e may recognize the I/O adapter as a different PCIe device.

When the above situation arises, the standby computer module 110e may determine that different storage devices are referred to before and after the changeover, for example, and suspend the processing that the active computer module 100a executed before the changeover.

As shown in FIG. 11, by maintaining the PCI bus number to be identical before and after the changeover, the configuration of the PCI buses in the standby computer module 110e is intentionally kept the same as that of the active computer module 100a. As a result, substantially the same I/O environment can be realized in both of active and standby systems.

Figure 12:
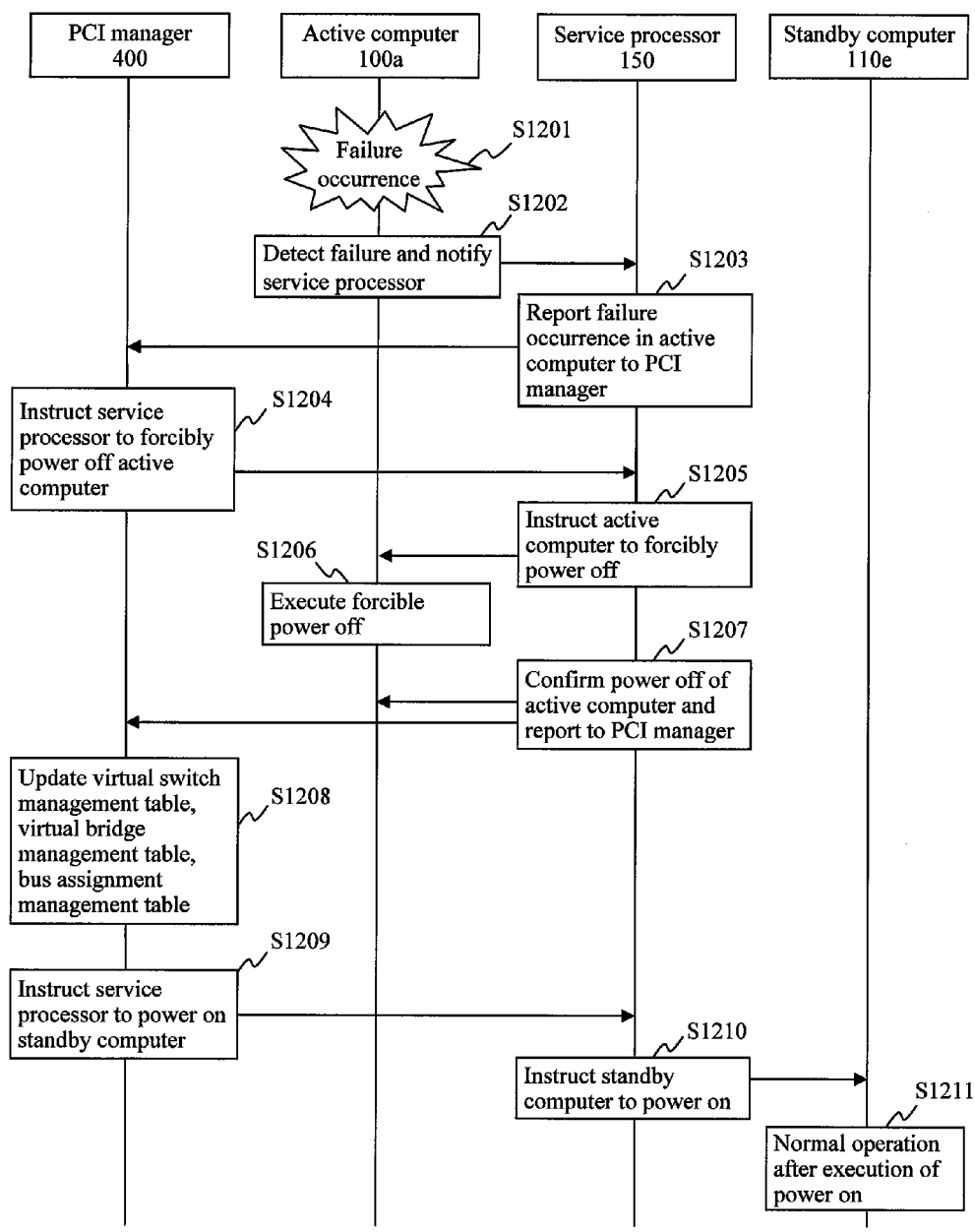
FIG. 12 is a sequence diagram illustrating operations in each of the devices when the active computer module 100a is changed over to the standby computer module 110e.

FIG. 12 is a sequence diagram illustrating operations in each of the devices when the active computer module 100a is changed over to the standby computer module 110e. In the following description, each of the steps in FIG. 12 is explained.

(FIG. 12: Step S1201)

Suppose that a failure occurs in the active computer module 100a in this step. This failure is assumed to be damages in an important function of the active computer module 100a such as damage in some of I/O bridges.

(FIG. 12: Step S1202)

The active computer module 100a detects the failure occurrence in itself, and notifies the service processor 150 of the failure occurrence via the management port 106a.

(FIG. 12: Step S1203)

The service processor 150 reports the failure occurrence in the active computer module 100a to the PCI manager 400. The type of the failure can also be reported.

(FIG. 12: Step S1204)

The PCI manager 400 instructs the service processor 150 to forcibly turn off the power of the active computer module 100a.

(FIG. 12: Step S1205)

The service processor 150 instructs the active computer module 100a to forcibly turn off the power.

(FIG. 12: Step S1206)

The active computer module 100a turns off the power in accordance with the instruction from the service processor 150.

(FIG. 12: Step S1207)

The service processor 150 confirms that the power of the active computer module 100a is turned off, and reports to the PCI manager 400 that the active computer module 100a is turned off.

(FIG. 12: Step S1208)

The PCI manager 400 instructs the virtual switch generator 310b to update the virtual switch management table 330, the virtual bridge management table 340, and the bus assignment management table 370 of the PCIe switches 300a and 300b so as to be the state explained with reference to FIG. 9. The virtual switch generator 310b updates each of the tables in accordance with the instruction. The virtual switch generator 310a also receives the update instruction in the same manner via the management port 399, and updates each of the table.

(FIG. 12: Step S1209)

The PCI manager 400 instructs the service processor 150 to turn on the power of the standby computer module 110e. At that time, the PCI bus numbers that correspond to the virtual bridges 360-10, 360-11, and 360-12 and are retained in the bus assignment management table 350 are also notified.

(FIG. 12: Step S1210)

The service processor 150 instructs the standby computer module 110e to turn on the power. In addition, the PCI bus numbers notified from the PCI manager 400 are notified as well.

(FIG. 12: Step S1211)

The standby computer module 110e turns on the power in accordance with the instruction from the service processor 150. In addition, by using the PCI bus numbers notified from the service processor 150, a connection path from the I/O bridge 104e to the I/O adapters 220 is recognized. Thereafter the standby computer module 110e executes normal operations.

In the above description, the operations when the system is changed over from the active computer module 100a to the standby computer module 110e are explained.

As described above, according to Embodiment 1, the standby computer module carries over the PCI bus numbers used by the active computer module and starts the operation when the active computer module is shifted to non-operational state. As a result, the standby computer module can realize the same I/O environment as that of the active computer module. Consequently, troubles caused by different I/O environments before and after the changeover from the active computer module to the standby computer module such as occurrence of boot failure of OS (Operating System) can be prevented.

In addition, according to Embodiment 1, the virtual switch generator 310 of the PCIe switch 300 generates virtual switches to logically connect each computer module and I/O adapters, and each computer module identifies the logical connection paths by assigning PCI bus numbers. As a result, each computer module can recognize connection paths equally as PCI buses regardless of whether a connection path is virtual or not. By taking over the PCI bus number from the active computer module to the standby computer module, even if the state of a virtual switch is changed in the PCIe switch 300 with the changeover, the standby computer module can recognize PCI buses as the same PCI buses as those before the changeover without recognizing the change.

Embodiment 2

In the Embodiment 2 of the present invention, an example that the computer system 1000 explained in Embodiment 1 is configured as a multiple structure is explained. With the multiple structure system, improvement in system availability is intended.

Figure 13:
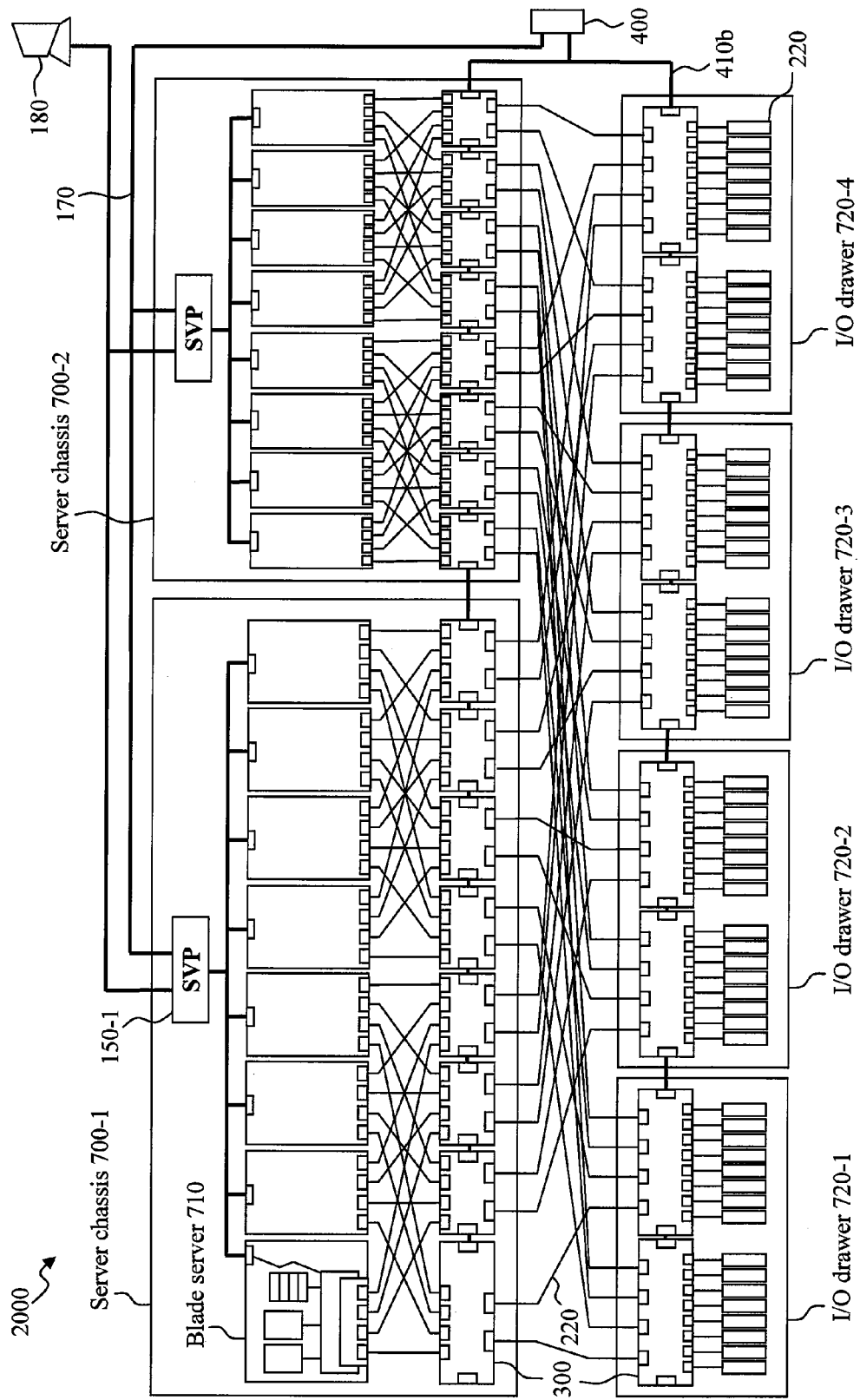
FIG. 13 is a configuration diagram of a computer system 2000 according to Embodiment 2.

FIG. 13 is a configuration diagram of a computer system 2000 according to Embodiment 2. The computer system 2000 according to Embodiment 2 includes plural server chassis 700 housing one or more computer modules and plural I/O drawers 720 housing one or more I/O adapters 220. Two stages of PCIe switches are introduced between the computer modules and the I/O adapters 220, and connection paths are constructed in a mesh-like pattern across each of the server chassis 700. In the following description, each configuration will be explained.

The server chassis 700-1 stores one or more (eight in FIG. 13) blade servers 710, a service processor 150 and one or more PCIe switches 300.

The blade servers 710 correspond to computer modules in Embodiment 1.

The service processor 150 manages operations of the blade servers 710 stored in the server chassis 700. The service processor 150 is connected to the PCI manager 400 via the management connection line 170. The service processor 150 is also connected to the management console 180 via arbitrarily interface.

The PCIe switch 300 in the server chassis 700 is connected to I/O bridges of one or more blade servers 710. The PCIe switches 300 are connected in cascade via the management ports 399. One of the PCIe switches 300 stored in the server chassis 700-1 is connected to the management port 399 in one of the PCIe switch 300 stored in the server chassis 700-2.

Although the server chassis 700-2 has the same configuration as that of the server chassis 700-1, there is a difference that one of the PCIe switches 300 is connected to the PCI manager 400 via the management port 399. The PCI manager 400 transmits/receives a control signal to/from the PCIe switch 300 stored in the server chassis 700-2. This control signal is shared among other PCIe switches 300 via the management ports 399, and is also shared among PCIe switches 300 in the server chassis 700-1.

The I/O drawers 720 store one or more PCIe switches 300 and one or more I/O adapters 220.

The PCIe switches 300 in the I/O drawers 720 are connected to one or more I/O adapters 220. The PCIe switches 300 are connected in cascade via the management ports 399. One of the PCIe switches stored in the I/O drawer 720 is connected to the management port 399 in one of the PCIe switch stored in another I/O drawer 720. In addition, one of the PCIe switches 300 stored in the I/O drawer 720-4 is connected to the PCI manager 400 via the management port 399.

The PCIe switches 300 stored in the server chassis 700 and the PCIe switches 300 stored in the I/O drawers 720 are connected in a mesh-like pattern via the buses 220.

The PCIe switches 300 as many as the blade servers 710 (eight) are disposed in the server chassis 700. Each of the blade servers 710 has four I/O bridges 104. Each of the I/O bridges 104 is connected to different PCIe switches 300. The I/O bridges 104 in the first through fourth blade servers 710 are connected to the first through fourth PCIe switches 300. The I/O bridges 104 in the fifth through eighth blade servers 710 are connected to the fifth through eighth PCIe switches 300.

Two PCIe switches 300 are disposed in the I/O drawer 720-1. Each of the PCIe switches 300 has four upstream ports. Two of the upstream ports are connected to the first and the fifth PCIe switches 300 in the server chassis 700-1, and the remaining two upstream ports are connected to the first and the fifth PCIe switches 300 in the server chassis 700-2. In the same manner, for the PCIe switches 300 in the I/O drawer 720-2, two upstream ports are connected to the second and the sixth PCIe switches 300 in the server chassis 700-1 and the remaining two upstream ports are connected to the second and the sixth PCIe switches 300 in the server chassis 700-2. The rest of the switchers are connected in a similar manner.

The above-described configuration offers the following technical advantages.

In the redundancy made by normal cold standby system, the configuration of the I/O adapters in the standby blade servers has to be the same configuration as the I/O adapters used in the active blade server. However, in this system, the I/O adapters used in the active blade server can be used in the standby blade server, and the I/O adapters for the standby blade servers are not necessary. Therefore, in the system with a number of I/O adapters like the configuration in the present invention, the cost of the I/O adapters in the standby system can be reduced.

In the redundancy made by normal cold standby system, additionally, the configuration of the I/O adapters in the standby system needs to be the same as that of the active blade server. Therefore when the configurations of the I/O adapters in plural active blade servers are different from one another, a number of the standby blade servers as many as the configuration of the I/O adapters of the active blade servers are required. In this system, however, no matter what configuration the I/O adapters of the active blade servers have, the configuration can be carried over to the standby blade server, and therefore, sixteen blade servers stored in the server chassis 700-1 and the server chassis 700-2 in the present configuration can be arbitrarily used either in the active system/standby system. For example, if many of the blade servers are assigned as the active system, a system with high usability can be established. If many of the blade servers are assigned as the standby system, a highly available system can be established.

As described above, according to Embodiment 2, the blade servers 710 can complement one another between the server chassis 700, in addition to complement one another in each server chassis 700. As a result, the availability of the computer system 2000 can be improved.

Moreover, according to Embodiment 2, since a multistage configuration is achieved by disposing PCIe switches 300 in the server chassis 700 and in the I/O drawers 720, a further flexible configuration of the computer system 2000 can be realized. For example, when there are unused ports in a PCIe switches 300, a new server chassis 700-3 and I/O drawer 720-5 can be introduced so as to establish a configuration with three server chassis 700 in parallel and five I/O drawers 720 in parallel.

Furthermore, according to Embodiment 2, PCI bus numbers can be carried over to the standby computer module (the blade server 710 in Embodiment 2) across server chassis via the service processor 150 to the PCI manager 400. As a result, the same I/O environment can be achieved in the active system and standby system across the server chassis, and therefore a further flexible cold standby system can be realized. For example, additional server operations such as adding a server chassis 700 later on and use the computer module in the server chassis as a standby system can be realized.

What is claimed is:

1. A computer apparatus comprising:
    a plurality of computer modules including processing devices;
    an I/O adapter;
    a switch including an upstream port connected to the computer modules and a downstream port connected to the I/O adapter; and
    a PCI manager,
    wherein the switch
    includes a virtual switch logically connecting the upstream port and the downstream port, and
    stores a first identifier logically identifying a connection path between a computer module in an operating state and a first virtual switch and a second identifier logically identifying a connection path between the first virtual switch and the I/O adapter,
    wherein when the computer module in the operating state moves to a non-operating state, the PCI manager detecting the non-operating state issues an update instruction of the identifiers to the switch,
    wherein the switch that received the update instruction of the identifiers
    carries over the first identifier to a third identifier logically identifying a connection path between a computer module in a standby state and a second virtual switch, and carries over the second identifier to a fourth identifier identifying a connection path between the second virtual switch and the I/O adapter, and wherein the computer module in the standby state moves to the operating state after the carryovers of the identifiers.

2. The computer apparatus of claim 1 wherein the switch includes a virtual switch generator for generating a virtual switch logically connecting the upstream port and the downstream port, and stores an identifier logically identifying a connection path between the computer module and the virtual switch and an identifier logically identifying a connection path between the virtual switch and the I/O adapter as virtual bridge management information.

3. The computer apparatus of claim 2 wherein the switch stores a switch identifier logically identifying a logical connection path between the upstream port and the downstream port as virtual switch management information.

4. The computer apparatus of claim 1 wherein when the computer module in the operating state moves to the non-operating state, the PCI manager managing a state of the computer module outputs to the switch an update instruction to update the virtual bridge management information and the virtual switch management information so that the first identifier and the second identifier are carried over to the third identifier and the fourth identifier logically identifying a connection path from the computer module in a standby state to the I/O adapter.

5. A computer system comprising one or more computer apparatuses of claim 1.

6. The computer system of claim 5 further comprising one or more second switches connected to a communication device used by the computer module, wherein the switch and the second switch are connected.

7. The computer system of claim 6 wherein the second switch includes an upstream port connected to the switch and a downstream port connected to a communication device used by the computer module, and wherein the downstream port in the switch and the upstream port in the second switch are connected.

8. An adapter carry-over method in a computer apparatus including a plurality of computer modules including processing devices, an I/O adapter, a switch including an upstream port connected to the computer modules and a downstream port connected to the I/O adapter, and a PCI manager, wherein the switch logically connects the upstream port and the downstream port, and stores a first identifier logically identifying a connection path between a computer module in an operating state and a first virtual switch and a second identifier logically identifying a connection path between the first virtual switch and the I/O adapter, wherein when the computer module in the operating state moves to a non-operating state, the PCI manager detecting the non-operating state issues an update instruction of the identifiers to the switch, wherein the switch that received the update instruction of the identifiers carries over the first identifier to a third identifier logically identifying a connection path between a computer module in a standby state and a second virtual switch, and carries over the second identifier to a fourth identifier identifying a connection path between the second virtual switch and the I/O adapter, and wherein the computer module in the standby state moves to the operating state after the carryovers of the identifiers.

* * * * *